Patented Apr. 8, 1952

2,592,169

UNITED STATES PATENT OFFICE 2,592,169

MANUFACTURE OF IRON BLUE PIGMENTS

John Owen Morrison, Chatham, N. J., and Benjamin Harrison Perkins, Brooklyn, N. Y., assignors to E. I. du Pont de Nemours & Company, Wilmington, Del., a corporation of Delaware No Drawing. Application July 24, 1946, Serial No. 685,922

4 Claims. (Cl. 23—77)

This invention relates to the manufacture of iron blue pigments of improved texture. More particularly it relates to the manufacture of iron blue pigments which are characterized by greatly improved ease of dispersion in organic vehicles, both when used alone and when used in admixture with other pigments.

The processes of manufacturing iron blue pigments such as the so-called Milori blue and Chinese blue classes are well known in the art. In these processes, aqueous solutions of ferrous sulfate, ammonium sulfate and sodium ferrocyanide are caused to inter-react to produce an aqueous slurry of an insoluble, pale-blue diammonium ferrous ferrocyanide compound "white intermediate," which is subsequently oxidized to the intense, commercially valuable, blue ammonium ferric ferrocyanide pigment, and then filtered, washed free from soluble salts, dried, and finally pulverized to a blue powder. Also well known in the art is the use of the iron blue pigment in the manufacture of chrome greens, either by admixture of an aqueous suspension of the washed blue pigment with a washed slurry of a suitable chrome yellow, followed by the familiar filtration, drying and grinding operations, or by admixture of the separately processed dry blue and dry yellow pigments.

To a very large extent, the subsequent use of these pigments involves their incorporation into vehicles, principally of an organic nature, for use as decorative and protective media in coating compositions. It is obvious that the value of the pigments for these purposes will depend to a large extent on the degree of dispersion in the vehicle. The ideal dispersion for any given pigment appears to be that in which the pigment is broken down substantially to the primary particles which were formed during the precipitation process. Also, an idea pigment when dispersed in a liquid vehicle is free of gritty particles and agglomerates.

However, most pigments undergo a certain amount of aggregation during the various processing steps, particularly during the drying, when more or less cementation of the particles appears to take place. The breaking down of these aggregates to reach the ultimate desired degree of dispersion and freedom from grit in the vehicle is usually effected in two steps, the first being dry grinding to a fine powder and the second being the incorporation or grinding of the pigment into the vehicle. Each of these steps requires the expenditure of a relatively large amount of labor and energy.

The quality of a pigment which determines the ease or difficulty with which it may be dispersed in a vehicle to give nearly its maximum tinctorial strength and to produce a lacquer, enamel or ink substantially free of gritty particles, will hereinafter be referred to collectively as the texture of the pigment. The iron blues and chrome greens have been particularly known in the art as being very difficult to grind to a satisfactory, fine state of sub-division.

Various methods of solving these difficulties have been proposed in the past. Most of these deal with the aqueous paste of the pigment color, and propose to treat it with volatile solvents or, on the contrary, with non-volatile, surface-active agents prior to drying or prior to filtration. Now, we set ourselves the problem of improving the texture of pigments of the iron blue class, and asked ourselves the question whether it would not be possible to attain our object by modifying the procedure of production of these pigments rather than by treating a paste of the pigment color.

Accordingly, and as our first attempt to solve this problem, we increased the degree of agitation employed in the manufacture of the "white intermediate" slurry. For a clearer understanding of our invention, we shall pause here to outline the practical procedure for producing iron blue.

In the conventional processes for the manufacture of iron blue pigments there are three essential steps:

1. Precipitation of the "white intermediate" by reaction of ferrous sulfate (copperas), ammonium sulfate and sodium ferrocyanide.

2. Digestion and acidification of the white intermediate slurry.

3. Oxidation of the white intermediate to the final blue pigment slurry.

The mentioned "white intermediate" is not strictly white. More often it is shaded blue to a greater or less degree, due to partial premature oxidation, which forms a small quantity of iron blue in the mixture.

In each of the above steps the reaction mass is an aqueous suspension or slurry, and each is carried out under agitation, and generally in an open vessel. The practice in the art has naturally developed to a point where the operator, either in the laboratory or in the plant, knows what degree of agitation to employ with any given apparatus to produce a pigment of best qualities. We have started with normal practice as a standard, and increased the agitation in steps 1 and 2 of the above process to a point where the energy consumption by the stirring apparatus was 2 to 4 times that which it had been in normal practice. To our dismay, we found that instead of improving the texture our modification actually made it worse.

Furthermore, it is known that several other factors which are commonly used in the art to improve the tinctorial properties and jetness of the product affect adversely the texture thereof, and vice versa. Thus, it is known that the tinctorial properties of an iron blue may be altered to give increased masstone jetness and increased tinctorial strength by any one or a combination of the following devices, namely: increase in quantity of ammonium sulfate used, decrease in acidity of slurry, decrease in time or temperature of heat treatment of the "white intermediate" slurry, or increase in degree of premature oxidation of the "white intermediate" slurry. But each of these devices increases the grittiness of the resulting product. Good texture and high tinctorial qualities thus appear to be mutually inconsistent, in the sense that factors of procedure which improve the one have a detrimental effect on the other.

For evaluating the texture quality of our pigment, we adopted the method described by T. J. Craig in "The American Ink Maker" (October and November issues, 1938) for measuring the proportion of grit. In this method, printing inks are made by grinding the pigments into a lithographic varnish, on a roller mill with a controlled setting of the clearance between the rolls. Samples of the ink can be taken after any desired number of passes over the mill and the inks are evaluated by pulling down a wedge of ink on a glass slide as more fully described by Craig in the above reference. Arbitrary standards have been established in which the number 20 has been assigned to an ink which is free from any grit that can be detected with the unaided eye, and 11 has been assigned to an ink which shows a very large amount of grit. The intervening numbers have been assigned in such a way as to represent approximately equal gradations in the amount of grit.

Now we found that whereas an iron blue produced by the hitherto standard conditions gave a grit index of 14, the pigment produced according to our first attempt, that is under highly increased agitation, rated only an index of 12. In compensation, we found that the tinctorial qualities of the color were considerably improved. By tinctorial qualities herein we refer to the customary qualities of tinctorial strength and jetness of masstone.

We concluded that increased agitation in an open vessel brings along with it an increased degree of premature oxidation of the precipitate in steps 1 and 2 of the above standard process, and is harmful to the product obtained in step 3. Accordingly, our next attempt was to use increased agitation while excluding contact with the atmosphere during steps 1 and 2 aforementioned. We found that while the texture of the eventual product was somewhat improved by this procedure, the tinctorial qualities suffered. At any rate, we no longer obtained the improvement in tinctorial qualities which we had observed in our first attempt.

After considerable further experimentation we have now found that both improved texture and tinctorial qualities in iron blue coloring matter can be achieved by modifying the procedure of preparing the white intermediate slurry in such a manner that while the reactants are subjected to a considerably higher degree of agitation than has been customary heretofore, there is maintained at the same time an environment of controlled oxidation in the reaction mass at this stage.

By "controlled oxidation" hereinabove we mean conditions which will convert some of the ferrous constituent in the reaction mass into ferric state, but to a degree such that not more than about 6% of the precipitate obtained in step 1 above is in the blue, oxidized state. This may be achieved in several optional ways. For instance, 1. One may select as initial material for the process a copperas which has undergone partial oxidation to a state say not less than 0.5% but not higher than about 5% and then carry out stages 1 and 2 of the process in a non-oxidizing atmosphere, for instance in a closed vessel containing nitrogen or carbon dioxide; or 2. One may start with pure copperas, but add a calculated quantity of a suitable oxidizing agent, for instance hydrogen peroxide, to the reaction mixture, and then carry out the reaction in a non-oxidizing atmosphere; again 3. One may start with relatively pure copperas, and carry out the reaction in a relatively throttled vessel, whereby the amount of air coming in contact with the agitated mass during stages 1 and 2 may be regulated according to previous tests or experience; and finally, 4. One may start with a relatively pure copperas and an appropriate amount of the sodium ferrocyanide may be replaced by sodium ferricyanide while the reaction is conducted in a non-oxidizing atmosphere.

Of course, combinations of the above optional conditions may be employed, or other procedures may be readily devised to achieve a partial oxidation of the ferrous ingredients in the early stages of the process, to the extent indicated.

Without limiting our invention the following examples are given to illustrate our preferred mode of operation. These examples are divided into two parts. In part I, experiments conducted on a laboratory scale are reported; these include procedures according to the old practice of the art as well as experiments leading up step-by-step to the combination of conditions employed in this invention; a table is also given comparing the properties of the colors obtained in these experiments. In part II are set forth examples, illustrating our preferred mode of procedure in plant-scale production. Parts mentioned therein are by weight.

PART I—EXPERIMENTAL

*Example 1.—(Standard process of the art)*

164 grams of copperas ($FeSO_4.7H_2O$) (trivalent iron 0.22% of total iron), 53.5 grams of ammonium sulfate (($NH_4)_2SO_4$), 37.5 grams of anhydrous sodium sulfate ($Na_2SO_4$) and 49 grams of sulfuric acid (100% $H_2SO_4$) were dissolved together in 1250 cc. of water in a 5 liter round bottomed flask equipped with a T-shaped agitator and the temperature adjusted to 86° F. With the agitator operating at a speed of about 90 R. P. M. and the flask open to the atmosphere, a solution of 250 grams of sodium ferrocyanide $(Na_4Fe(CN)_6.10H_2O)$ in 2500 cc. of water at 86° F. was added over a period of one hour. With the agitator continuing at the same rate, the slurry of "white precipitate" was heated to 167° F. in one hour and held at that temperature for 15 minutes after which a solution of 56.5 grams of H₂SO₄ (100%) was added in 5 minutes. After stirring for an additional 10 minutes, the pigment was oxidized by adding a solution of 13.75 grams of sodium chlorate (NaClO₃) in 125 cc. of water, followed by continued stirring for about one hour. It was then filtered, washed substantially sulfate free and dried in an oven at moderate heat. After pulverization, the dry pigment was tested for texture as described above. After two passes over a loosely set roller mill, the ink exhibited a grit rating of 14 which is typical of the better iron blues of the prior art but is, nevertheless, much inferior to the texture desired in dry pigments. Tinctorially the product is a typical Milori blue.

*Example 2.—(Standard process, but more vigorous agitation)*

Example 1 was repeated in every way except that the agitator was operated at a speed of 200 R. P. M. When the resulting dry color was made into a lithographic ink and tested for texture exactly as in Example 1, the grit rating was 12 and it possessed an extremely dark masstone, closely approaching a Chinese blue.

*Example 3.—(Standard process, but non-oxidizing atmosphere)*

Example 1 was repeated except that before beginning the operation, the flask was closed to the air and filled with an atmosphere of nitrogen which was maintained under a slight positive pressure up to the point of adding the oxidizing agent. Whereas in Examples 1 and 2 the "white precipitate" became noticeably blue during the digestion period (much more so in Example 2), in this example there was substantially no formation of blue color in the precipitate. The grit rating of the finished pigment was 13.

The product is tinctorially of the Milori blue type but is sufficiently lighter in masstone relative to the products of Examples 1 and 4 that its use would be seriously curtailed. By the use of formulating variables well known to the art, such as increasing the amount of ammonium sulfate employed, the product of this example could be made to equal the tinctorial properties of prior art pigments but a concomitant loss in texture would occur.

*Example 4.—(Non-oxidizing atmosphere and using extremely vigorous agitation)*

Using the ingredients of Example 1 and the nitrogen atmosphere of Example 3, the agitator was operated at a speed of 200 R. P. M. Even with this vigorous agitation, there was again very little formation of blue color prior to the introduction of the oxidizing agent. The final pigment in the form of an ink exhibited a grit rating of 17 which is a significant and noteworthy improvement especially as the tinctorial properties are substantially those of the product of Example 1.

*Example 5.—(Process of this invention—extremely vigorous agitation plus controlled oxidation)*

The conditions of Example 4 (high speed agitation and nitrogen atmosphere were duplicated except that the trivalent iron content of the copperas was increased from 0.22% to 1.0% by the addition of a calculated amount of hydrogen peroxide. The grit rating of the final pigment increased from 17 to about 18 and the tinctorial properties were somewhat superior particularly being darker and more jet in masstone.

The relative textures and tinctorial properties of the products of the foregoing examples are compared in the following table:

| Example | Texture | Color |
|---|---|---|
| 1 | 14 | Standard. |
| 2 | 12 | Very dark jet masstone. |
| 3 | 13 | Inferior (light masstone). |
| 4 | 17 | Satisfactory (equal to standard). |
| 5 | 18 | Better than standard (dark jet masstone). |

PART II—COMMERCIAL PRODUCTION

*Example 6.—(Iron blue pigment)*

A vat of several thousand gallons capacity and equipped with a lid for closing and with a T-shaped agitator passing through the lid, is charged with 164 parts of copperas, 53.5 parts of ammonium sulfate, 37.5 parts of anhydrous sodium sulfate, 49 parts of sulfuric acid (100% basis) and 1250 parts of water. A sample of the copperas having been analyzed for its ferric iron content, a calculated quantity of hydrogen peroxide is now added to the vat, to increase the ferric iron in the copperas to about 1% of the total iron therein. The temperature of the mass is adjusted to about 80°–90° F. The lid is now closed, and solid carbon dioxide is introduced into the vat in sufficient quantity to sweep out its air content and to maintain therein a slight positive pressure (2 inches of water). The agitator is started and gradually increased in speed until its power consumption is found to be about 1.0 H. P. per 1000 gallons, over and above that required to operate the agitator in an empty vat. In one procedure, using an apparatus of 9000 gallons capacity and a stirrer whose extreme diameter across the paddles was 13 feet, we found that the above power consumption was reached at 16 R. P. M. (At 12 R. P. M., the excess power consumption was only about 0.25 H. P. per 1000 gallons).

A solution of 250 parts of sodium ferrocyanide in 2500 parts of water at 86° F. is now added slowly. With the agitator continuing at the same rate, the slurry of "white precipitate" is heated slowly to 167° F., and held at that temperature for a short time, after which a solution of 56.5 parts of H₂SO₄ (100%) is added. After stirring for a short time, the pigment is oxidized by adding a solution of 13.75 parts of sodium chlorate in 125 parts of water, followed by continued stirring. It is then filtered, washed substantially sulfate-free and dried in an oven at moderate heat. After pulverization, the dry pigment may be tested for texture as described above. A product of excellent qualities is thus obtained, having substantially the same grit rating and the same excellent tinctorial qualities as in Example 5 above.

*Example 7.—(Chrome green pigment)*

The procedure of Example 6 is followed down to the point of filtering the oxidation product and washing the same until free of sulfate ion, but not including the drying step. The press cake is then diluted with water, with suitably intensive mechanical mixing, as in a colloid mill or high speed ribbon mixer, until a slurry or mobile consistency is obtained, containing between 5% and 10% of the dispersed color. A portion of this washed slurry containing 900 parts of iron blue is mixed with a washed slurry containing 1100 parts of chrome yellow, of a type suitable for the preparation of chrome green. The resulting chrome green slurry is filtered, dried, and pulverized in the customary manner, yielding a dark-shade chrome-green characterized by extreme ease of dispersion in organic vehicles. The texture rating of the dry green pigment is 17.

It is to be understood that the herein described specific embodiments of this invention may be subjected to variation and modification without departing from the scope and spirit of this invention.

Thus, for example, the specified ingredient proportions, temperatures and time intervals may be readily manipulated throughout considerable ranges of variation; the specified oxidant may be replaced by chromate salts, hydrogen or sodium peroxide, air, or mixtures thereof; the ammonium naphthenate treatment of U. S. P. 2,294,387 or other texture improving materials may be used; or the washed press cake may be treated with water-miscible or water-immiscible volatile organic solvents prior to drying. Other chemical modifications, for example, introduction of nickel or cobalt compounds into the formulation, may readily be made by those skilled in the art without rendering the beneficial action of this invention ineffective.

The beneficial effects of the invention require only two basic physical conditions: namely, control of the environment so as to prevent excessive oxidation during the first two stages of the process and subjecting the mass to extremely vigorous agitation during the same stages. The two stages referred to embrace the steps of (1) reaction of the initial aqueous solutions, and (2) digestion and acidification of the intermediate precipitate.

The intensity of agitation required for attainment of the beneficial effects of the invention is dependent in some degree upon the concentration and other factors influencing the viscosity of the "white intermediate" slurry. While it may vary with the size of batch operated upon and with the particular type of apparatus employed, it is readily determinable on the basis of simple experiments, within the skill of the worker in the art.

Furthermore, although for convenience of speech we refer above to batch processes, it will be recognized that our improved process is readily amenable to embodiment in a continuous mode of operation, wherein a series of enclosed operating units are arranged to carry out continuously the three essential steps of the process, namely precipitation, digestion-acidification and oxidation. In such a continuous process installation, exclusion of oxidizing environment may be achieved either by sweeping the apparatus with an inert vapor atmosphere, such as carbon dioxide, flue gas, etc., or by operating the equipment so that each of the closed units is substantially filled with the slurry at all times.

The optimum ferric ion concentration in the copperas solution as described in Example 5 is such that approximately 1.15% of the pigment is directly precipitated as the ferric (blue) compound. A substantially lesser degree of this direct precipitation of ferric compound results in loss of desirable tinctorial properties without commensurate improvement in ease of dispersion of the product, while a substantially greater degree of direct precipitation of ferric compound produces a more jet masstone and greener hue accompanied by a pronounced loss of ease of dispersion of the final product in organic vehicles. As already indicated above, any one of several optional methods may be used to achieve this degree of preliminary oxidation, including for instance initial selection of a partially oxidized copperas, addition of oxidizing agents, or control of the oxygen content of the atmospheric environment in the vessel in the early stages of agitation.

The proportions of iron blue and chrome yellow employed in the preparation of the improved chrome green of Example 7 are not critical and may be varied throughout the range of hues familiar to the art.

The advantages of this invention are manifest in the improved texture of pigments made by this process. This improved texture results in superior coating compositions characterized by a minimum or complete absence of grit and the development of full color strength with a minimum of grinding.

The advantages to the user of the pigment are manifested in the superior quality of the resulting product and in a substantial increase in the rate of production, resulting both from a decrease in the number of times it is necessary to pass the material over the mill and from the ability to run a thicker film of material on the mill since it is unnecessary to set the rolls as closely as has heretofore been needed.

We claim as our invention:

1. In a process for producing an iron blue pigment of improved texture and tinctorial qualities wherein a substantially white iron blue pigment intermediate is precipitated by reacting an acidified aqueous solution of ferrous sulfate and ammonium sulfate with an aqueous solution of sodium ferrocyanide and the resulting precipitate is digested and acidified, the improvement which comprises effecting said precipitation, digeston, and acidification in a closed reaction vessel while the reaction mass is subjected to vigorous mechanical agitation, requiring at least about 1.0 H. P. per 1000 gallons of suspension, and to such oxidizing conditions that not more than about 6% of said precipitate becomes converted to the blue, oxidized state, and thereafter converting the resulting, partially oxidized intermediate while in aqueous suspension to the final blue pigment.

2. In a process for producing an iron blue pigment of improved texture and tinctorial qualities wherein a substantially white iron blue pigment intermediate is precipitated by reacting an acidified aqueous solution of ferrous sulfate and ammonium sulfate with an aqueous solution of sodium ferrocyanide and the resulting precipitate is digested and acidified, the improvement which comprises effecting said precipitation, digestion and acidification in a closed reaction vessel while the reaction mass is subjected to vigorous mechanical agitation, requiring at least about 1.0 H. P. per 1000 gallons of suspension, while excluding the atmosphere from contact with the reactants and utilizing in the reaction an oxidizing agent which will provide a small quantity of iron blue color amounting to not to exceed 6% of the total pigment to be produced, and thereafter converting the resulting partially oxidized intermediate while in aqueous suspension to the final blue pigment by further oxidation treatment.

3. In a process for producing an iron blue pigment of improved texture and tinctorial quality wherein a substantially white iron blue pigment intermediate is precipitated by reacting an acidified aqueous solution of ferrous sulfate and ammonium sulfate with an aqueous solution of sodium ferrocyanide under such oxidizing conditions that a fraction of said ferrous sulfate ranging from .05% to not to exceed 5% of its total quantity is converted to the ferric state, and then digesting and acidifying the resulting precipitate, the improvement which comprises effecting said precipitation, digestion and acidification in a closed reaction vessel while the reaction mass is subjected to vigorous mechanical agitation of about 1.0 H. P. per 1000 gallons of suspension and thereafter converting the resulting partially oxidized intermediate while in aqueous suspension to the final blue pigment through further oxidation treatment.

4. In a process for producing an iron blue pigment of improved texture and tinctorial qualities wherein a substantially white iron blue pigment intermediate is precipitated by reacting an acidified aqueous solution of ferrous sulfate and ammonium sulfate with an aqueous solution of sodium ferrocyanide under such oxidizing conditions that the ferrous sulfate is partially oxidized to the ferric state to an extent ranging from 0.5% to 5% of its total iron content and the resulting precipitate is digested and acidified, the improvement which comprises effecting said precipitation digestion and acidification in a closed reaction vessel while the reaction mass is subjected to vigorous mechanical agitation requiring about 1.0 H. P. per 1000 gallons of suspension, and while the atmosphere is excluded from contact with the reactants, thereafter converting the resulting partially oxidized intermediate to the final blue pigment by a final oxidation treatment, and then drying, pulverizing and recovering said final pigment.

JOHN OWEN MORRISON.
BENJAMIN HARRISON PERKINS.

REFERENCES CITED

The following references are of record in the file of this patent:

UNITED STATES PATENTS

| Number | Name | Date |
|---|---|---|
| 2,275,929 | Thomasset | Mar. 10, 1942 |

OTHER REFERENCES

"Cyanogen Compounds," Williams, J. & A. Churchall, London (1915), pp. 249–250.